Reissued Aug. 6, 1929. Re. 17,394

UNITED STATES PATENT OFFICE.

CARLISLE K. ROOS, OF GLEN ELLYN, ILLINOIS, ASSIGNOR TO UNITED STATES GYPSUM COMPANY, OF CHICAGO, ILLINOIS, A CORPORATION OF ILLINOIS.

SURFACING MATERIAL.

No Drawing. Original No. 1,606,722, dated November 9, 1926, Serial No. 733,198, filed August 20, 1924. Application for reissue filed September 1, 1927. Serial No. 217,009.

This invention relates to improvements in surfacing materials of a plastic nature, particularly for use in the decoration of the interior of buildings.

The object of this invention is the formation of a surfacing material suitable for the production of a monolithic plaster effect on non-shrinkable wallboard construction. It is particularly well adapted as a filling for crevices between the wallboard edges and when applied over the board produces a homogeneous surface by hiding the joints, nail heads or any surface defect. Ordinary oil wall paints and calcimines on account of their thin film and relatively smooth surface are incapable of accomplishing this as satisfactorily.

The composition of this surfacing material in accordance with this invention consists of a binder such as casein or ordinary glue, a fibrous extender of light asbestos fiber (air separated to produce short lengths); a non-siliceous loading filler such as fine ground natural anhydrite, gypsum, or dead burned anhydrous calcium sulfate.

The specific advantageous properties of my wall surfacer are due to the characteristics of the particular type of particle aggregations making up the "body" of the composition. In addition to a binder of nitrogenous adhesive, I combine into a "body" material, a siliceous ingredient or ingredients, the particles of which are foliate, like talc, or schistose like sericite and arranged in fibriform or feathery assembly as distinguished from cubical or spheriodal; the hydrous silicate asbestos when powdered and separated to produce minute particles which render such material light, "fluffy" or "downy", and non-packing, is a preferable type of this extending component. With material of such properties I combine a heavier non-siliceous loading filler, the individual particles of which are "platonic" or "rotund" bodied and also do not soften and disintegrate when mixed with water like friable clays, kaolin, shales and similar earthy siliceous materials. Thus, when ground to minute particles, this filler is close packing and "weighting" in character rather than "flaky" and "fluffy", and so, fine ground natural anhydrite or other relatively insoluble alkaline earth compounds are preferred materials. Thus, this complete "body" material when wetted to a paste furnishes the combined properties of a light, easy working, wet plastic mortar which will dry to a surface of high density because of these heavy filler particles segregating in between the wet extended fibrous or foliate particles and as drying proceeds, composite packing together ensues whereby the extended particles are held securely in all directions internally, finally yielding a dry, dense, tough wall surfacing without checks, cracks and other surface defects.

As it is desirable to produce a moderately washable surface, it is preferred to use casein with a weak alkali such as borax, as the binder, together with hydrated lime to promote washability. In this formula the borax causes rapid solution of the casein followed by a slow and incomplete precipitation of the casein as calcium caseinate by the calcium hydroxide in hydrated lime.

Fine ground anhydrite is a preferred filler, for it has been found to be a cheap, relatively insoluble and heavy white material now considered a waste by-product. It has the desirable effect, together with lithopone, of weighing down the asbestos fibers and causing them to lay flat.

The fine ground anhydrite is a desirable filler for when available, is an inexpensive insoluble and heavy weight material, the particles of which are "platonic" or "rotund" bodied, depending on the nature of the deposit. However, the variable nature of anhydrite deposits often exhibits a complete change in particle structure and assembly in continuous parts of the vein, which changes necessitate the admixture of equivalent character of material, such as other insoluble alkaline earth compounds, to maintain the uniform and necessary properties of this filling material.

An example of a desirable formula, consists of casein 12 parts, borax 2 parts, fine ground asbestos fiber 40–50 parts, fine ground anhydrite 20–25 parts, a pigment such as lithopone 15–20 parts, hydrated dolomite lime 5 parts.

The main problem in decoration of non-shrinkable wallboard construction is the concealment of the joining edges and the prevention of hair line cracks at the joints. The asbestos fiber besides producing "bulk" and "slip" to the surfacing finish aids very materially in preventing these minute cracks by virtue of its fibrous reinforcing structure.

Specifically, finely powdered amphibole with its feathery bulk, induces easy working properties because of its talc-like nature; also, because of its foliate and fibriform assembly of particles it "bridges" over and prevents the minute joint cracks normally occurring in wallboard construction.

The constituents of the finish are blended together dry and made ready for use by the mechanic through the addition of water, mixing the preparation to a moderately heavy paste. After the wallboard joints have been filled with the same preparation mixed to a stiff putty, the finish is applied to the wallboard with a wide wall brush, and while still in a moist condition is stippled, sponged, troweled or otherwise tooled to produce various wall plaster texture effects. It is usually applied in one coat to a thickness of 1/32 to 1/16 inch. It is here that the bulky fibrous or feathery character of the asbestos permits the finish to be built up to considerable thickness without running or sagging on the wall.

One coat of this composition has greater hiding power and obscures the wallboard joinings better than three coats of oil, paint or calcimine, hence the economical features are obvious.

While this finish can be tinted with lime proof colors, it is also entirely practical to subsequently paint it with ordinary oil paints and glazes.

What I claim is:

1. A surfacing material adapted to be rendered pasty or plastic by the addition of water comprising twelve parts of casein, two parts of borax, approximately forty-five parts of asbestos fibers, approximately twenty-two parts of fine ground natural anhydrite, approximately seventeen parts of lithopone and five parts of hydrated lime all blended together.

2. A surfacing material adapted to be rendered pasty or plastic by the addition of water, comprising casein, borax, asbestos fibre, natural anhydrite, lithopone and hydrated lime all blended together dry in substantially the proportions specified.

3. A surfacing material comprising casein, borax, mineral fibres and natural anhydrite both ground fine, lithopone, and hydrated dolomite lime, all blended together dry, then sufficient water added to render the mass pasty.

4. A surfacing material comprising casein, borax, mineral fibres and anhydrous calcium sulphate both ground fine, lithopone, and hydrated lime, all blended together dry, and sufficient water to render the mass pasty.

5. A surfacing material comprising casein, a weak alkali, a siliceous extender, hydrated lime, finely ground insoluble matter containing alkaline earth compounds, and lithopone, all blended together dry, and adapted to be rendered plastic with water for brush application.

6. A dry, powdered surfacing material comprising a nitrogenous adhesive as a binder, a weak alkali, hydrated lime, asbestos, insoluble alkaline earth compounds and lithopone, all blended together dry and adapted to be rendered plastic with water for brush application.

7. A surfacing material comprising a nitrogenous adhesive as a binder, a weak alkali, hydrated lime, a siliceous extender, relatively insoluble calcium sulphate and lithopone as pigment, all blended together dry and adapted to be rendered plastic with water for brush application.

8. A surfacing material comprising a nitrogenous adhesive as a binder, a weak alkali, a siliceous extender, relatively insoluble alkaline earth compounds and lithopone, all blended together dry and adapted to be rendered plastic with water for brush application.

9. A surfacing material comprising casein glue, lithopone, relatively insoluble calcium compounds, hydrated lime and a siliceous extender, all blended together in dry, powdered form and adapted to be rendered plastic with water for brush application.

10. A surfacing material for plaster wallboard adapted to be rendered pasty or plastic by the addition of water, comprising twelve parts of casein, two parts of borax, seventeen parts of lithopone, five parts of hydrated lime, forty-five parts of siliceous matter and twenty-two parts of natural anhydrite, all the ingredients being mixed and blended together dry ready for use approximately in the proportions named.

CARLISLE K. ROOS.